G. L. THOM.
BINDING AND SEALING TAPE.
APPLICATION FILED JAN. 7, 1913.
1,089,986.  Patented Mar. 10, 1914.
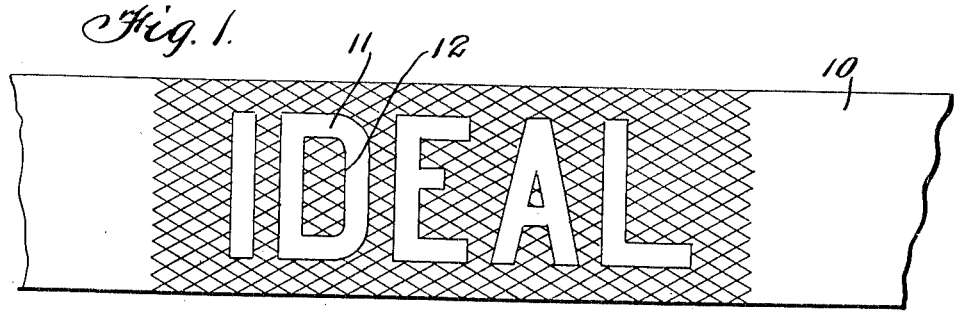
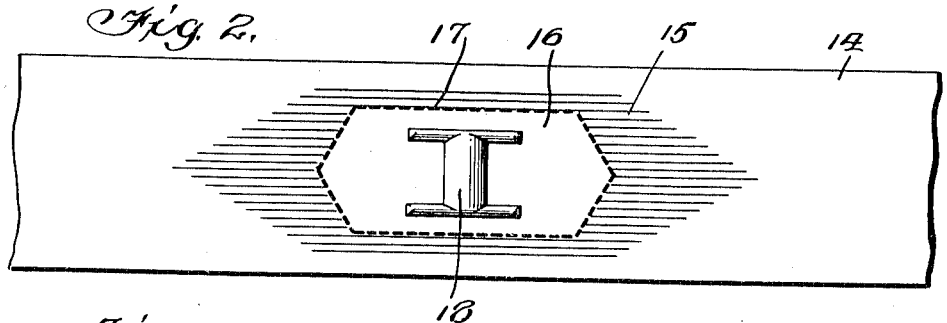
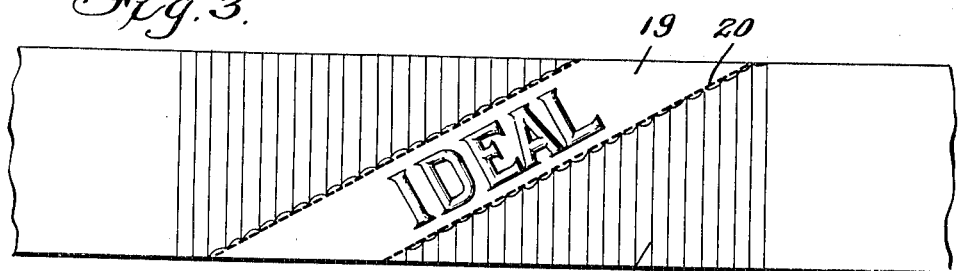
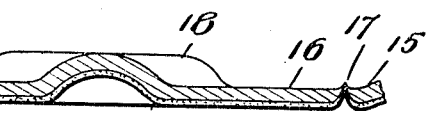
Witnesses:
Helen Van Etten
Mary Perry
Inventor
George L. Thom
By his Attorneys
Mason Fenwick & Lawrence

UNITED STATES PATENT OFFICE.

GEORGE L. THOM, OF BROOKLYN, NEW YORK, ASSIGNOR TO IDEAL COATED PAPER CO., OF BROOKFIELD, MASSACHUSETTS, A CORPORATION OF NEW JERSEY.

BINDING AND SEALING TAPE.

1,089,986.  Specification of Letters Patent.  Patented Mar. 10, 1914.

Application filed January 7, 1913. Serial No. 740,700.

*To all whom it may concern:*

Be it known that I, GEORGE L. THOM, a citizen of the United States, residing at Brooklyn, in the county of Kings and State of New York, have invented certain new and useful Improvements in Binding and Sealing Tapes; and I do hereby declare the following to be a full, clear, and exact description of the invention, such as will enable others skilled in the art to which it appertains to make and use the same.

This invention relates to binding and sealing tapes and has for its object the provision of a safety tape for binding or sealing packages which will prevent tampering with the contents of any package bound or sealed thereby so that any disturbance of said tape and any attempt to reapply the same for fraudulent purposes may be immediately detected.

Another object of this invention is to provide a tape having parts of varying strength and adhesiveness. I also provide a tape which may be employed for distinguishing certain parts thereof from adjacent or surrounding parts so as to set forth a name, a letter, figure, trade mark or symbol by means either of corrugations, scorings, perforations, abrasions or a combination of these media.

A further object of this invention is a provision of a tape to which a certain portion has a greater or lesser bearing strength than the adjacent portion thereof so that after the tape is applied, it is impossible to remove the entire tape intact.

Further objects will be apparent from the following specification, appended claims and drawings in which, Figure 1 is a plan view of one form of the invention, Fig. 2 is another form, Fig. 3 is a further form, Fig. 4 is a sectional view through a portion of the tape shown in Fig. 1, Fig. 5 is a sectional view through a portion of the tape shown in Fig. 3 and Fig. 6 is a similar view through a portion of the tape shown in Fig. 2.

By this invention it is possible to prepare a binding and sealing tape so as to render certain portions thereof susceptible to being easily torn and at the same time to cause such treated portions to set forth any name, letter, symbol or figure.

In Fig. 1 of the drawing a series of letters are outlined by a scoring which renders the line of demarcation easily torn and this scoring takes place from the gummed side of the paper and the preparation of the tape may be set forth as follows: 10 indicates a gummed tape of the desired width which may be passed between scoring and treating rollers or presses so as to outline letters, figures or symbols by a deep scoring from the gummed side and to provide a background for said letters, figures or symbols as by corrugating or pressing the paper at intervals adjacent to the outline for said letters, figures or symbols. The numeral 11 indicates a series of letters which are scored from the under side as at 12 so as to present a uniform and flat surface which will adhere to the article to which the tape is applied but the background for said letters is formed into a plurality of symmetrical designs being embossed, which designs or embossing presents reduced ridges 13 which adhere to the article when the tape is applied. As is clearly seen the background may be more easily removed after application than the body portion of the design included in the scoring.

Fig. 2 shows a somewhat modified form embodying the same principle and 14 indicates a tape corrugated or ridged as at 15 and having a panel 16 which is outlined as at 17 by a series of perforations or slits to permit the corrugated portion 15 being easily removed from about the panel 16.

Fig. 3 is a further modified form in which the diagonal panel 19 is separated from the adjacent portions by a series of perforations or slits 20 and the adjacent portions of the tape to said panel may be corrugated or ribbed transversely with respect to the tape.

Figs. 4, 5, and 6 show clearly how the designs, embossing, scoring or corrugating takes place from the gummed side of the tape so as to leave flat surfaces of the designs and reduced or narrow edges of the background or corrugated portions so that when the tape is applied the background adheres less than the design or panel. When the tape is applied and subsequently removed for fraudulent purposes, it will become mutilated at the portions bearing the design and when the tape is reapplied, reapplication of glue or gum to said tape will cause a different expansion of said tape from its former application so that the designs will not register as in the former application or should the designs be made to register the remainder of the tape would buckle or blister so as to reveal malicious tampering of the tape.

Modifications may be made within the scope of this invention as claimed and the form shown is for illustrative purposes only.

Having thus described my invention, I claim:

1. In a binding and sealing tape, a gummed tape, portions of said tape being formed into a design, said design having the gummed face thereof adapted to adhere to an article when the tape is applied, said design being separated from the adjacent portions of the tape by reduced portions of said tape, and said adjacent portions of said tape to said design having the gummed face thereof depressed so as to expose reduced areas for adhesion.

2. In a binding and sealing tape, comprising a gummed tape, portions of said tape being formed into designs and having the lines of demarcation rendered weak so as to easily tear, the adjacent portion of said tape to said designs being depressed, and said designs being adapted to entirely adhere to an article while the surrounding depressed portions have reduced portions thereof adapted to adhere to an article.

3. In a binding and sealing tape, a gummed tape, a design formed therein, said design being separated from the adjacent portions of said tape by weakening fibers of said tape, the adjacent portions of said tape about said design being depressed at intervals to render such portions of a different degree of adhesiveness than the design from the rest of the tape.

In testimony whereof I affix my signature in presence of two witnesses.

GEORGE L. THOM.

Witnesses:
 HUGO MOCK,
 HELEN VAN ETTEN.